United States Patent
Tsuda et al.

(10) Patent No.: US 6,706,794 B1
(45) Date of Patent: Mar. 16, 2004

(54) POWDER COATING COMPOSITION HAVING HIGH WEATHER RESISTANCE

(75) Inventors: Nobuhiko Tsuda, Settsu (JP); Ryuji Iwakiri, deceased, late of Settsu (JP), by Miyuki Iwakiri, legal representative, Minoo JPX; Ryoichi Fukagawa, Settsu (JP); Keisuke Tano, Settsu (JP); Daisuke Tanizawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/869,607

(22) PCT Filed: Oct. 4, 1999

(86) PCT No.: PCT/JP99/05460
§ 371 (c)(1),
(2), (4) Date: Jul. 2, 2001

(87) PCT Pub. No.: WO01/25346
PCT Pub. Date: Apr. 12, 2001

(51) Int. Cl.$^7$ .................................................. C08K 7/20
(52) U.S. Cl. ...................... 524/430; 526/249; 526/254; 526/255; 428/407; 428/463
(58) Field of Search .................. 524/430; 428/407, 428/463; 526/249, 254, 255

(56) References Cited

U.S. PATENT DOCUMENTS

| | | | | |
|---|---|---|---|---|
| 4,153,661 A | * | 5/1979 | Ree et al. .................... 264/120 |
| 5,147,934 A | * | 9/1992 | Ito et al. .................... 525/124 |
| 5,213,896 A | * | 5/1993 | Schlipf et al. .............. 428/407 |
| 5,591,512 A | * | 1/1997 | Kaneno et al. ............. 428/141 |
| 5,635,548 A | * | 6/1997 | Kittle et al. ................ 523/220 |
| 5,898,043 A | | 4/1999 | Uemae et al. |
| 2001/0003127 A1 | * | 6/2001 | Tsuda et al. ................ 525/200 |

FOREIGN PATENT DOCUMENTS

| | | |
|---|---|---|
| EP | 0 301 557 A1 | 2/1989 |
| EP | 0 301 557 | 2/1989 |
| EP | 0 869 157 | 10/1998 |

OTHER PUBLICATIONS

International Preliminary Examination Report for PCT/JP99/05460, dated Mar. 8, 2000.
International Search Report for PCT/JP99/05460 dated Dec. 28, 1999.
Office Action from Australian Patent Office for Application No. 60025/99 dated Jul. 21, 2003.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

A powder coating composition which comprises (A) a fluorine-containing copolymer having a crosslinkable reactive group and (B) a curing agent being capable of forming crosslinkage by reacting with the crosslinkable reactive group of the fluorine-containing copolymer in a weight ratio (A)/(B) of 40/60 to 98/2, and contains rutile titanium oxide and other pigment. The powder coating composition can form a coating film which can exhibit excellent weather resistance even under very strict environment specified in AAMA 2605 standard, etc., and is suitable particularly for an exterior member for building, for example, an aluminum sash.

13 Claims, No Drawings

POWDER COATING COMPOSITION HAVING HIGH WEATHER RESISTANCE

TECHNICAL FIELD

The present invention relates to a thermosetting fluorine-containing resin powder coating composition which gives a coating film having further improved weather resistance. The powder coating composition is suitable for coating on an exterior member for building.

BACKGROUND ART

Compositions described in JP-B-6-104792, etc. are known as a thermosetting fluorine-containing resin powder coating composition.

The thermosetting powder coating composition is prepared by dry-blending a resin for coating in the form of powder, pellet, granule or tablet, a curing agent, a pigment and other additives for coating, melt-kneading the mixture at a temperature of not less than a melting temperature of the resin to give a uniform composition and then pulverizing. Further after an average particle size, particle size distribution, etc. are adjusted by means of classification, or the like, electric charge is given to the composition by means of electrostatic coating, fluidized bed coating, or the like and then the composition is coated on a substrate and cured by heating to form a coating film. In the preparation process, a heating temperature at melt-kneading of the composition is usually from 50° to 140° C., and a heating temperature at forming the coating film is usually from 150° to 220° C.

However in case where the powder coating composition was prepared from the thermosetting fluorine-containing resin by the above-mentioned preparation process, it was difficult to regulate color development. Though the reason for that is not clear, it is presumed that impurities, etc. in the fluorine-containing resin react with a pigment, thereby inhibiting color development. Also the fluorine-containing resin has a problem that when titanium oxide and other pigment are used together, floating of the pigment occurs remarkably at melt-kneading and weather resistance is inferior as compared with a solvent-based coating composition comprising similar components. It is presumed that the reason for that is such that dispersibility of the pigment in the fluorine-containing resin at a melt-kneading step is not good and thus the pigment is not dispersed uniformly in a coating film at forming the coating film.

Also a weather resistance test by exposing in Florida for 10 years is described in AAMA2605 which is a standard for aluminum building materials of AAMA (American Architectural Manufacturers Association), and a coating composition which is prepared from a thermoplastic solvent type or thermosetting solvent type fluorine-containing resin by using titanium oxide and other pigment together and satisfies such a weather resistance standard was identified. However a coating film obtained from a thermosetting powder coating composition and satisfying that standard has not yet been known.

An object of the present invention is to provide a thermosetting fluorine-containing resin powder coating composition which has enhanced weather resistance particularly and also improved pigment dispersibility by a combination use of titanium oxide and other specific pigment.

DISCLOSURE OF INVENTION

The present invention relates to a powder coating composition which comprises (A) a fluorine-containing copolymer having a crosslinkable reactive group and (B) a curing agent being capable of forming crosslinkage by reacting with the crosslinkable reactive group of the fluorine-containing copolymer in a weight ratio (A)/(B) of 40/60 to 98/2, and also contains rutile titanium oxide and other pigment.

A preferable fluorine-containing copolymer (A) is a thermosetting fluorine-containing copolymer having a crosslinkable reactive group, which comprises a fluoroolefin unit and has a fluorine content of not less than 10% by weight, a MFR (melt flow rate) of from 0.1 to 100 g/10 min measured at 100° to 180° C. and a glass transition temperature of from 30° to 120° C. Also the copolymer (A) may comprise a resin containing no fluorine as a resin for powder coating composition.

Examples of the preferable other pigment are inorganic pigments such as a baked pigment, organic pigments and carbon powder.

It is preferable that a particle size ratio of the above-mentioned titanium oxide to the other pigment is from 1/0.01 to 1/20.

The powder coating composition of the present invention can give a coating film meeting the AAMA2604 standard and further stricter AAMA2605 standard.

The powder coating composition of the present invention is suitable for coating on exterior members for building, for example, aluminum sash which are excellent particularly in weather resistance.

BEST MODE FOR CARRYING OUT THE INVENTION

Various fluorine-containing polymers can be used as the thermosetting fluorine-containing copolymer (A) having a crosslinkable reactive group which is used in the present invention. For example, there are a copolymer having a fluoroolefin unit, an acrylic copolymer having a fluoroalkyl group in its side chain, a partly fluorinated polyester, and the like. Particularly preferred is a thermosetting fluorine-containing copolymer having a crosslinkable reactive group which comprises a fluoroolefin unit and also has a fluorine content of not less than 10% by weight, a MFR (melt flow rate) of from 0.1 to 100 g/10 min measured at 100° to 180° C. and a glass transition temperature of from 30° to 120° C.

Examples of the fluoroolefin are tetrafluoroethylene, chlorotrifluoroethylene, trifluoroethylene, vinylidene fluoride, hexafluoropropylene, pentafluoropropylene, and the like. The fluoroolefin may be selected optionally depending on characteristics required for a coating film, components of the copolymer and combination with the curing agent. Those fluoroolefins can be used solely or in combination of two or more thereof. Examples of the crosslinkable reactive group of the thermosetting fluorine-containing copolymer to be used in the present invention are hydroxyl group, carboxyl group, amido group, amino group, mercapto group and glycidyl group and in addition, activated halogen such as bromine and iodine, isocyanate group, and the like.

Examples of a method for introducing such a crosslinkable reactive group into the copolymer are a method of copolymerizing monomer having a crosslinkable reactive group, a method of decomposing a part of the copolymer, a method of reacting a reactive group of the copolymer with a compound giving a crosslinkable reactive group thereto, and the like.

Examples of the comonomer which can introduce a suitable crosslinkable reactive group by copolymerization are, for instance, monomers having hydroxyl group or a group which can be converted to hydroxyl group and having a double bond copolymerizable with fluoroolefin. Examples thereof are one or a mixture of two or more of hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; esters of hydroxyalkylcarboxylic acid and vinyl alcohol such as vinyl hydroxyacetate, vinyl hydroxypropionate, vinyl hydroxybutyrate, vinyl hydroxyvalerate, vinyl hydroxyisobutyrate and vinyl hydroxycyclohexanecarboxylate; hydroxyalkyl allyl ethers such as hydroxyethyl allyl ether, hydroxypropyl allyl ether, hydroxybutyl allyl ether, hydroxyisobutyl allyl ether and hydroxycyclohexyl allyl ether; hydroxyalkyl allyl esters such as hydroxyethyl allyl ester, hydroxypropyl allyl ester, hydroxybutyl allyl ester, hydroxyisobutyl allyl ester and hydroxycyclohexyl allyl ester; hydroxyalkyl esters of acrylic acid or methacrylic acid such as 2-hydroxyethyl acrylate, hydroxypropyl acrylate, 2-hydroxyethyl methacrylate and hydroxypropyl methacrylate; partly fluorine-substituted compounds thereof; and the like. One or two or more thereof may be selected and used as a comonomer for introducing hydroxyl group.

Examples of the comonomer having carboxyl group are, for instance, α,β-unsaturated carboxylic acids such as acrylic acid, methacrylic acid, itaconic acid, succinic acid, succinic anhydride, fumaric acid, fumaric anhydride, crotonic acid, maleic acid and maleic anhydride and in addition, fluorine-substituted monomers such as perfluorobutenoic acid, and the like. Also examples of the comonomer having glycidyl group are, for instance, glycidyl (meth)acrylate, glycidyl vinyl ether, glycidyl allyl ether, and the like. Examples of the comonomer having amino group are, for instance, amino alkyl vinyl ether, amino alkyl allyl ether, and the like. Examples of the comonomer having amido group are, for instance, (meth)acrylamide, methylolacrylamide, and the like. Examples of the comonomer having nitrile group are, for instance, (meth) acryronitrile, and the like. Examples of the comonomer having isocyanate group are, for instance, vinyl isocyanate, isocyanate ethyl acrylate, and the like. It is particularly preferable to use a vinyl or allyl ether or ester compound as a comonomer for introducing a crosslinkable reactive group from the viewpoint of excellent copolymerizability with fluoroolefin.

Example of the method for partly decomposing the copolymer is a method of copolymerizing a monomer having a hydrolyzable ester group after polymerization and then hydrolyzing the copolymer to generate carboxyl group in the copolymer. Also it is possible to form crosslinkage directly by transesterification in a curing reaction without carrying out ester hydrolysis mentioned above.

As the method for reacting the copolymer with a compound giving a crosslinkable reactive group thereto, for example, a method of introducing carboxyl group by reacting a divalent carboxylic acid anhydride such as succinic anhydride with a fluorine-containing copolymer having hydroxyl group can be employed suitably.

In addition to the above-mentioned fluoroolefin unit and the unit having a crosslinkable reactive group, a comonomer coplymerizable with those two components can be copolymerized with the fluorine-containing copolymer to be used in the present invention in order to reduce a melting point or a glass transition temperature of the fluorine-containing copolymer for further enhancing workability at coating and imparting physical properties such as proper hardness, flexibility and gloss to the coating film. Example of such an optional comonomer to be used is one which has an unsaturated group being active so as to be copolymerizable with fluoroolefin and does not lower weather resistance of the coating film remarkably.

Suitable examples of such an optional comonomer are ethylenically unsaturated compounds, for instance, alkyl vinyl ethers such as ethyl vinyl ether, propyl vinyl ether, butyl vinyl ether, isobutyl vinyl ether and cyclohexyl vinyl ether; esters of vinyl alcohol and alkylcarboxylic acid such as vinyl acetate, vinyl propionate, vinyl butyrate, vinyl isobutyrate, vinyl valerate, vinyl cyclohexanecarboxylate, vinyl benzoate and vinyl para-t-butylbenzoate; alkyl allyl ethers such as ethyl allyl ether, propyl allyl ether, butyl allyl ether, isobutyl allyl ether and cyclohexyl allyl ether; alkyl allyl esters such as ethyl allyl ester, propyl allyl ester, butyl allyl ester, isobutyl allyl ester and cyclohexyl allyl ester; alkenes such as ethylene, propylene, butylene and isobutylene; acrylic acid and methacrylic acid; esters of acrylic acid or methacrylic acid such as ethyl acrylate, propyl acrylate, butyl acrylate, isobutyl acrylate, 2-ethylhexyl acrylate, ethyl methacrylate, propyl methacrylate, butyl methacrylate, isobutyl methacrylate and 2-ethylhexyl methacrylate; partly fluorine-substituted compounds thereof; and the like. Those optional comonomers may be used solely or in combination of two or more thereof.

Among them, vinyl or allyl compounds or alkenes being excellent in copolymerizability with fluoroolefin are used preferably as the optional comonomer. In case of using vinyl or allyl alkyl esters or alkyl ethers, a linear, branched or alicyclic alkyl group having about 2 to about 10 carbon atoms can be preferably used as an alkyl group.

From the above-mentioned point of view, examples of the thermosetting fluorine-containing copolymer (A) are, for instance, chlorotrifluoroethylene/cyclohexyl vinyl ether/ hydroxybutyl vinyl ether copolymer, tetrafluoroethylene/ isobutylene/hydroxybutyl vinyl ether copolymer, tetrafluoroethylene/hexafluoropropylene/ethylene/ hydroxybutyl vinyl ether copolymer, vinylidene fluoride/ tetrafluoroethylene/perfluorobutenoic acid copolymer, and the like.

It is desirable that the thermosetting fluorine-containing copolymer (A) to be used for the thermosetting powder coating composition of the present invention has a fluorine content of not less than 10% by weight. When the fluorine content is less than 10% by weight, a coating film having a sufficient weather resistance cannot be obtained.

Also it is desirable that the MFR of the thermosetting fluorine-containing copolymer (A) is within a range of from 0.1 to 100 g/10 min when measured at 100° to 180° C. When the MFR measured at 100° C. of a low temperature side is less than 0.1 g/10 min, meltability of the resin at kneading with other additives such as a pigment is not sufficient, and color developing property, weather resistance and impact resistance of the obtained coating film are inferior. When the MFR measured at 180° C. of a high temperature side is larger than 100 g/10 min, a viscosity of the resin at melt-kneading is lowered and the melt-kneading is not sufficient, and thus color developing property, weather resistance and impact resistance of the obtained coating film are also inferior.

Further it is desirable that the thermosetting fluorine-containing copolymer (A) has a glass transition temperature of from 30° to 120° C. When the glass transition temperature is not more than 30° C., storage stability of the obtained coating composition is not sufficient. When exceeding 120° C., melt-kneading property is lowered, thereby making it impossible to sufficiently disperse additives such as titanium oxide and other pigment at the melt-kneading step.

In addition to the above-mentioned thermosetting fluorine-containing copolymer (A), if necessary, a general purpose non-fluorine-containing thermosetting resin, for example, an epoxy resin, acrylic resin, polyester resin, or the like may be blended as a powder resin component. Examples thereof are, for instance, an acrylic resin prepared by copolymerizing an ester of acrylic acid or methacrylic acid with other copolymerizable monomer, a polyester resin prepared by condensation reaction of polyvalent carboxylic acid and polyhydric alcohol, an epoxy resin, and the like.

Among those non-fluorine-containing resins for thermosetting powder coating composition, the polyester resin is preferable. Particularly the polyester resin having isophthalic acid and/or 1,4-hexanedicarboxylic acid as a polyvalent acid is preferable from the viewpoint of weather resistance and physical properties.

An adding amount of the non-fluorine-containing resin for thermosetting powder coating composition is not more than 100 parts by weight, preferably not more than 80 parts by weight based on 100 parts by weight of the fluorine-containing copolymer (A). If the adding amount is too much, weather resistance is lowered.

Examples of the curing agent (B) which is another component of the powder coating composition of the present invention are, for instance, blocked isocyanate compounds obtained by blocking isocyanate compounds with a blocking agent. Examples of the isocyanate compound are, for instance, polyisocyanate compounds such as isophorone diisocyanate, tolylene diisocyanate, xylilene diisocyanate, 4,4'-diphenylmethane diisocyanate and hexamethylene diisocyanate, dimer or trimer thereof, polyisocyanate compounds modified with polyhydric alcohol such as trimethylolpropane, and the like. Examples of the blocking agent are, for instance, ε-caprolactam, phenol, benzyl alcohol, methyl ethyl ketoxime, and the like. It is preferable that the blocked isocyanate compound is a compound which is a solid at room temperature.

In addition, there are aliphatic dibasic acids such as fumaric acid, succinic acid, adipic acid, azelaic acid, sebacic acid and dodecanedioic acid; acid anhydrides such as phthalic anhydride, trimellitic anhydride and pyromellitic anhydride; polyester resin or acrylic resin having an acid value of from 10 to 300 mgKOH/g, a glass transition temperature of from 30° to 120° C. and a number average molecular weight of from 1,000 to 15,000; dicyandiamide or dicyandiamide derivative; imidazole or imidazole derivative; amine compounds such as dibasic acid dihydrazide, diaminophenyl methane and cyclic amidine compound; melamine resin; glycidyl compounds such as diglycidyl terephthalate, diglycidyl paraoxybenzoate, triglycidyl isocyanate, spiroglycol diglycidylether, [hydantoine] hydantoin compound and alicyclic epoxy resin; hydroxyl-containing compounds such as 1,4-bis2'-hydroxyethoxy benzene, bishydroxyethyl terephthalate, styrene/allyl alcohol copolymer, spiroglycol, tris2-hydroxyethyl isocyanurate and acrylic resin or polyester resin having a hydroxyl value of from 10 to 300 mgKOH/g, a glass transition temperature of from 30° to 120° C. and a number average molecular weight of from 1,000 to 15,000; and the like. Suitable curing agent is a compound which is a solid at room temperature.

In the thermosetting powder coating composition of the present invention, the fluorine-containing copolymer as the component (A) and the curing agent as the component (B) are blended in a weight ratio (A)/(B) of 40/60 to 98/2, preferably 50/50 to 97/3.

One of the features of the present invention is to use titanium oxide, particularly rutile titanium oxide and other pigment together without fail.

Rutile titanium oxide to be used is preferably in the form of powder having an average particle size of from 0.1 to 0.4 μm. Also rutile titanium oxide surface-treated with silica, alumina or zirconium compound is preferable.

Other pigment to be used together with titanium oxide may be an inorganic pigment or organic pigment. When the inorganic pigment is used, a gloss retention of a coating film at exposing can be improved greatly. Further by using a baked pigment such as a metal oxide or composite metal oxide among the inorganic pigments, a change in color difference can be reduced. Also when the organic pigment is used, color developing property at melt-kneading can be improved.

Examples of the inorganic pigment are powders of metal oxide, composite metal oxide, metal salt, metal, luster, ultramarine, gold pink, and the like. Further examples of the metal oxide are iron oxide, chromium oxide, and the like; examples of the composite metal oxide are those comprising two or more metals such as titanium, nickel, cobalt, niobium, zinc, iron, chromium, aluminum, manganese, barium and zirconium and forming a crystalline structure; examples of the metal salt are salts of cadmium, chromium, molybdenum, iron, and the like; and examples of the metal are aluminum, stainless steel, and the like. Examples of the organic pigment are powders of condensed azo compounds, isoindolenone compounds, quinacridone compounds, diketopyrrolopyrol compounds, anthraquinone compounds, dioxadine compounds, metal complexing azo compounds, allyl amide compounds, azo compounds, diallylide compounds, pyrazolone compounds, toner compounds, phthalocyanine compounds, basic dye compounds, naphthol compounds, benzimidazolone compounds, and the like.

It is preferable that a mixing ratio (weight ratio) of rutile titanium oxide to other pigment is in a range of from 1/100 to 100/1. If an amount of titanium oxide is less than 1/100, an excellent hiding effect of titanium oxide is not exhibited, and if more than 100/1, an effect of improving weather resistance by combination use with other pigment cannot be obtained.

It is preferable that a ratio of average particle size of rutile titanium oxide powder to other pigment powder is from 1/0.01 to 1/20, further 1/0.05 to 1/10 because a change in color difference at exposing outdoor is decreased.

The thermosetting fluorine-containing resin powder coating composition of the present invention can be prepared by usual process of dry-blending the thermosetting fluorine-containing copolymer (A), curing agent (B), rutile titanium oxide, other pigment and as case demands, non-fluorine-containing resin, and then melt-kneading the mixture and pulverizing.

Also it is preferable that a glass transition temperature of the thermosetting powder coating composition of the present invention is from 30° to 120° C., more preferably 35° to 100° C. When the glass transition temperature is less than 30° C., the composition is difficult to become a solid and therefore cannot be used as a thermosetting powder coating composition. Also when the glass transition temperature is more than 120° C., a softening point thereof becomes too high and running of a coating film becomes bad. An average particle size of the powder coating composition is usually not more than 400 μm.

Examples of a substrate to be coated with the powder coating composition of the present invention are a metallic substrate, ceramic substrate, wood, synthetic resin substrate, and the like. Examples of the metallic substrate are substrates of iron, aluminum, stainless steel, copper, zinc or alloys thereof, for instance, stainless steel and brass.

The coating can be carried out, for example, with a commercially available electrostatic coating machine or fluidized bed coating machine. After coating uniformly, a coating film is formed by baking with a hot air oven, infrared ray oven, induction heater, or the like. The metallic substrate may be previously coated with a primer. From the viewpoint of adhesion and rust preventing effect, it is preferable that the metallic substrate is subjected to pre-treatment such as washing with water, degreasing, rust removing, surface preparation and chemical conversion treatment. Degreasing is carried out by alkali cleaning by dipping in or spraying of sodium silicate, sodium phosphate or caustic soda. Rust removing treatment is carried out by a method of spraying a blasting material such as alumina, silicon carbide, iron powder or glass onto a substrate at high speed. Surface preparation is carried out by dipping into an aqueous solution of surface modifier or by spraying thereof. Chemical conversion treatment is carried out preferably by dipping in zinc phosphate, iron phosphate, chromate, chromic acid or phosphate chromate or by spraying thereof.

When the powder coating composition of the present invention is coated on an aluminum substrate, a coated aluminum such as an aluminum building material which conforms to not only the above-mentioned AAMA2604 standard but also AAMA2605 standard can be obtained.

Explained below are AAMA2604 standard and AAMA2605 standard.

AAMA is an abbreviation of American Architectural Manufacturers Association. AAMA2604 standard and AAMA2605 standard are standards self-imposed by AAMA of the allied industries which specify characteristics required for highly weather resistant organic coating film for extrusion-molded aluminum and aluminum panel. The AAMA standard is one of the strictest standards all over the world. Mentioned below are characteristics requirements and test methods common to the both standards. a peeling test is carried out with a 20 mm wide adhesive tape. A temperature at testing is in a range of from 18° to 27° C.

Wet adhesion test: A coated plate which is marked with a lattice pattern in the same manner as in the dry adhesion test is dipped in distilled water at 38° C. for 24 hours. A peeling test with an adhesive tape is carried out within 5 minutes after wiping off water.

Boiling water adhesion test: A coated plate which is marked with a lattice pattern in the same manner as in the dry adhesion test is dipped in distilled water at 99° to 100° C. for 20 minutes. A peeling test with an adhesive tape is carried out within 5 minutes after wiping off water.

Criteria for judgement: There shall be no peeling on and off the cross-cut lattice pattern. In the wet adhesion test and boiling water adhesion test, there shall be no blistering.

Impact Resistance Test:
An impact resistance test is carried out at 18° to 27° C. by applying, on a test plate, a load which causes a 3 mm deep dent on the test plate by using an impact resistance tester (Gardner impact resistance tester) having a spherical head of 16 mm diameter. A peeling test is carried out with a 20 mm wide adhesive tape.

Criteria for judgement: There shall be no peeling of a coating film from the substrate.

Abrasion test:
A sand dropping test specified in ASTM D 968 is carried out, and an abrasion coefficient defined by the following equation is obtained.

(Pretreatment of Test Plate)
Pretreatment of substrate: An extruded aluminum or aluminum panel is subjected to pretreatment according to ASTM D 1730, Type B Method 5 (amorphous phosphate chromate treatment) or Method 7 (amorphous phosphate treatment).

Cleaning of substrate: After removing organic or inorganic staining substance and oxide by multi-staged steps, a coating film is formed. A coating amount per unit area is 40 mg/f$^2$.

(Method of Evaluation)
Uniformity of Color:
To be evaluated with naked eyes under a single light source.
Criteria for judgement: The both of a user and a supplier of a coating shall evaluate and confirm that color of the coating film is uniform.

Gloss:
To be evaluated by measuring a reflectance of 60° incident light according to ASTM D 523.
Criteria for judgement: A gloss shall be within ±5 of the standards of a supplier of a coating.

Hardness of coating film:
A pencil hardness test specified in ASTM D 3363 is carried out.
Criteria for judgement: There shall be no scratch with a pencil of hardness F.

Adhesion:
Dry adhesion test: After a lattice pattern of 100 squares is marked at intervals of 1 mm on a coating film by a cross-cutting method, $$\text{brasion coefficient} = \text{Amount of sand used } (L)/\text{Coating thickness (mil)}$$

Criteria for judgement: An abrasion coefficient of a coating film shall be 40 at minimum.

Chemical Resistance Test:
Hydrochloric acid resistance test: Ten drops of hydrochloric acid having a concentration of 10% by volume is dripped on a surface of a coating film at 18° to 27° C., and the coating film is covered with a watch glass and allowed to stand for 15 minutes, followed by washing with water. This test is repeated four times at minimum.

Criteria for judgement: Evaluation is made with naked eyes to confirm that there is neither blistering nor a change in appearance.

Mortar resistance test: 75 Grams of lime for building which is specified in ASTM C 207, 225 g of dry sand and about 100 g of water are mixed and passed through a 10 mesh sieve to give a soft paste. This paste is coated in a thickness of 12 mm on an area of 1300 mm$^2$ of the above-mentioned test piece having a coating film dried for 24 hours or more, and allowed to stand at a relative humidity of 100% RH at 38° C. for 24 hours. The test is repeated four times at minimum.

Criteria for judgement: Mortar must be removed easily from the coated surface. A remaining mortar must be able to be removed with a wet cloth. A remaining lime must be able to be removed with 10% hydrochloric acid. As a result of evaluation with naked eyes, there shall be neither lowering of adhesion nor a change in appearance.

Nitric acid resistance test: A 70% nitric acid which is specified by ACS (American Chemical Society) is poured into an about 200-ml wide-mouthed bottle in an amount up to about a half of the bottle, and a test plate is placed to block the mouth of the bottle with a coated surface of the plate facing downward. Thirty minutes after, the coated surface is washed with flowing water and water is wiped off. Then one hour after, a change in color difference is measured. The color difference is determined by a calculation method specified in ASTM D 2244.

Criteria for judgement: A change in color difference ΔE before and after the test shall not exceed 5.

Detergent resistance test: Nacconal 90F available from Allied Chemical Co., Ltd. is diluted with distilled water to give a 3% solution. In the obtained solution are dipped at least two test plates at 38° C. for 72 hours. Then the test plates are taken out, water is wiped off and a peeling test is carried out with a 20 mm wide adhesive tape. If there is a blistering, the blistering portion is subjected to a peeling test with a tape.

Criteria for judgement: There shall be no lowering of adhesion and neither a change in appearance nor blistering when evaluated with naked eyes.

Window cleaner resistance test: Ten drops of a universal glass cleaner comprising 5 parts by weight of DAWANOL PM (available from Dow Chemical Co., Ltd.), 5 parts by weight of propylene glycol, 35 parts by weight of isopropanol and 55 parts by weight of water are dripped on a coated surface and immediately the coated surface is covered with a watch glass. The coated surface is allowed to stand at 18° to 27° C. for 24 hours and then washed with flowing water, and an appearance thereof is evaluated with naked eyes. After drying at room temperature for four hours, an adhesion test (dry) is carried out.

Criteria for judgement: There shall be neither blistering nor a change in appearance. There shall be no peeling on and off the cross-cut lattice pattern.

Corrosion Resistance Test:

Moisture resistance test: A test is carried out by allowing a test plate to stand at 38° C. at a relative humidity of 100% for 4,000 hours in a thermo-hygrosat specified in ASTM D 2247 or ASTM D 4485.

Criteria for judgement: There shall be no (slight) blistering having a size exceeding No. 8 specified in FIG. 4 of ASTM D 714.

Brine spraying test: A coating film of a test plate is notched with a knife to a depth reaching a substrate. According to ASTM B 117, a spraying test is carried out by using 5% brine for 4,000 hours. After the spraying test, water is wiped off from the sample and a peeling test is carried out by using an adhesive tape.

Criteria for judgement: Evaluation is made according to criteria specified in ASTM D 1654. Rating shall be a point 7 or more at the notched portion and a point 8 or more at the un-notched portion.

Weather Resistance Test:

The test is carried out in Florida (lat. 27° N.) by inclining a test plate at an angle of 45° and facing it in the southern direction. The test plate is exposed for five years at minimum (AAMA 2604 standard) or for 10 years at minimum (AAMA 2605 standard) to evaluate a change in color difference, a degree of chalking, gloss retention and corrosion resistance.

Criteria for judgement: A change in color difference ΔE shall be 5 or less. With respect to un-cleaned test plate, a rating of chalking according to ASTM D 4214 shall be 8 or less in case of a colored plate, and 6 or less in case of a white plate. A gloss retention measured at 60° reflectance shall be 50% or more. When measuring a thickness of dry coating film before and after the exposure with a meter equivalent to an eddy current meter specified in ASTM B 244, a test plate shall have corrosion resistance to an extent of a reduction in a coating thickness being 10% or less.

As mentioned above, AAMA 2604 standard differs from AAMA 2605 standard in a period of weather resistance test by exposing in Florida. Test periods of AAMA 2604 and AAMA 2605 are five years and ten years, respectively.

Before the advent of the powder coating composition of the present invention, a known coating composition being capable of forming a coating film satisfying the AAMA 2605 standard was only a high temperature baking type solvent coating composition prepared by dispersing a polyvinylidene fluoride (PVdF) resin and acrylic resin in a solvent, and no powder coating composition satisfying the AAMA 2605 standard had been known.

Also in the thermosetting fluorine-containing resin powder coating composition of the present invention, by using a resin for powder coating composition which is prepared by blending a non-fluorine-containing copolymer, a coating film conforming to AAMA 2604 standard being slightly lower than AAMA 2605 standard can be obtained.

The present invention is then explained by means of examples and preparation examples, but is not limited to them.

PREPARATION EXAMPLE 1

A 4,000-ml stainless steel autoclave was charged with 760 g of deionized water and 7 g of potassium carbonate, and compressing with pressurized nitrogen gas and degassing were repeated three times to remove dissolved oxygen. Then under reduced pressure the autoclave was charged with 572 g of chlorofluoroethane (HCFC141b), 340 g of HFP and 3 g of 4-hydroxybutyl vinyl ether, and a temperature inside the autoclave was adjusted to 35° C. Further a pressure inside the autoclave was adjusted to 9 kg/cm$^2$G with a TFE/ethylene (Et) monomer mixture having a % by mole ratio of 82/18, and then the autoclave was charged with 4 g of cyclohexane and 24 g of 25% isobutyryl peroxide solution of flon 225 to initiate a reaction. With advance of the reaction, since lowering of the pressure inside the autoclave arose, a monomer mixture of TFE/Et/HFP having a % by mole ratio of 45/39/16 was supplied continuously to maintain the pressure at 9 kg/cm$^2$G. Every six hours, 1.5 g of 4-hydroxybutyl vinyl ether and 12 g of 25% isobutyryl peroxide solution of flon 225 were added and the reaction was carried out for 12 hours. Then the inside of the autoclave was restored to ordinary temperature and pressure to terminate the reaction. The obtained solid was washed and dried to give 152 g of white powder of fluorine-containing copolymer (A-1). As a result of $^{19}$F-NMR, $^1$H-NMR and elemental analyses, the obtained fluorine-containing copolymer was a copolymer comprising TFE/Et/HFP/4-hydroxybutyl vinyl ether (34/47/12/7% by mole). A glass transition temperature thereof was 48° C., and a melt viscosity MFR measured at 140° C. was 56 g/10 min.

The fluorine-containing copolymer was pulverized with an impact hammer mill.

PREPARATION EXAMPLE 2

A 1,000-ml pressure resistant reactor made of glass was charged with 350 g of deionized water and 1 g of sodium carbonate, and introducing of pressurized nitrogen gas and degassing were repeated three times to remove oxygen. Then the reactor was charged with 188 g of chlorotrifluoroethylene (CTFE), and then 25.5 g of 2,2,2-trifluoroethylene (TrFVE), 5.8 g of 4-hydroxybutyl vinyl ether (HBVE) and 30 g of CTFE. A temperature inside the reactor was adjusted to 45° C. with stirring, and 0.35 g of diisopropyl peroxydicarbonate was added as a polymerization initiator, followed by 8-hour polymerization at the same temperature. A pressure inside the reactor was 2.1 kg/cm G at initiating the polymerization, and 0.2 kg/cm$^2$G at terminating the polymerization. The polymer was added to petroleum ether with stirring and then recovered by re-precipitation, followed by drying under reduced pressure to give 48 g of a fluorine-containing copolymer (A-2). A glass transition temperature thereof was 53° C. An amount of hydroxyl group of the copolymer was determined by an acetic anhydride-pyridine method described in JIS K 0070, and hydroxyl group corresponding to 10% by mole of HBVE was confirmed. According to elemental analysis, carbon was 31.7%, fluorine was 42.9% and chlorine was 15%. The obtained copolymer was one comprising CTFE/TrFVE/HBVE (50/40/10% by mole). A melt viscosity MFR measured at 140° C. was 0.1 g/10 min.

The fluorine-containing copolymer was pulverized with an impact hammer mill.

PREPARATION EXAMPLE 3

A 3,000-ml pressure resistant stainless steel reactor with a stirrer was charged with 1,000 g of t-butanol, 106 g of cyclohexyl vinyl ether (c-HxVE), 60 g of isobutyl vinyl ether (i-BVE), 165 g of 4-hydroxybutyl vinyl ether (HBVE), 5 g of potassium carbonate and 0.5 g of azobisisobutyronitrile (AIBN), and dissolved air was removed by solid deaerating method by using liquid nitrogen. Then 330 g of chlorotrifluoroethylene (CTFE) was introduced and the reactor was heated up gradually. While maintaining a temperature of the reactor at 65° C., a reaction was continued with stirring. Ten hours after, the reactor was cooled with water to room temperature, un-reacted monomer was released and the reactor was opened to terminate the reaction. Then the reactor was heated up to 60° C., and a dispersing medium was removed under reduced pressure of 1 mmHg over 24 hours to give a fluorine-containing copolymer (A-3). As a result of $^{19}$F-NMR, $^1$H-NMR and elemental analyses, the obtained fluorine-containing copolymer was a copolymer comprising CTFE/c-HxVE/i-BVE/HBVE (49/26/9/16% by mole). A glass transition temperature thereof was 43° C., and a melt viscosity MFR measured at 140° C. was 12 g/10 min.

The fluorine-containing copolymer was pulverized with an impact hammer mill.

EXAMPLE 1

55.5 Parts of thermosetting fluorine-containing resin powder (A-1) prepared in Preparation Example 1, 24 parts of rutile titanium oxide (TI-PURE R-960 available from du Pont, average particle size: 0.35 µm), 6 parts of inorganic pigment (KNR available from Toda Kogyo Kabushiki Kaisha, average particle size: 0.15 µn), 14 parts of curing agent (ε-caprolactam-blocked isocyanate, B-1530 available from Hüls Co., Ltd.) and 0.5 part of leveling agent (MODAFLOW available from Monsanto Chemical Co., Ltd.) were dry-blended in Henschel mixer (available from Kabushiki Kaisha Aikosha Seisakusho) for three minutes. Then the mixture was melt-kneaded at 125° C. with a twin-screw melt-kneader (16 mm TWIN EXTRUDER available from Prism Co., Ltd.), and after cooled, pulverized at room temperature for three minutes with a universal pulverizer (available from IKA Co., Ltd.). The melt-kneading and pulverizing step was further repeated two times, and the obtained powder was classified with a 200 mesh screen to give a thermosetting fluorine-containing resin powder coating composition.

The powder coating composition was coated on an aluminum plate A714 subjected to chemical conversion treatment specified in JIS 2003 by using a corona discharge type powder coating gun (GX3300 available from Onoda Cement Kabushiki Kaisha) at an applied voltage of 40 kV, and then immediately baking was carried out at 200° C. for 20 minutes to give a coated plate for testing. The following tests were carried out by using the coated plate. The results are shown in Table 1.

Thickness of Cured Coating Film:

A thickness is measured with an eddy-current instrument EL10D for measuring thickness (available from Kabushiki Kaisha Sanko Denshi Kenkyusho). Gloss:

An angle of reflection at an angle of 60 degrees is measured according to JIS K 5400. Also powders obtained by carrying out the melt-kneading and pulverizing step in Example once, twice and three times, respectively were passed through a 200 mesh screen for classification to give coating compositions. Each of the coating compositions was coated under the same conditions as in Example 1 to give coated plates for testing. A gloss of each plate was measured, and a change in gloss was evaluated. In cases of organic pigment and carbon black, a gloss value reached a constant value by one step.

Weather Resistance:

After an accelerated weather resistance test is carried out for 1,000 hours with I-SUPER UV tester Model W-13 (Light/Dew/Rest=11/11/1 HR is assumed to be one cycle) available from Iwasaki Denki Kabushiki Kaisha, a gloss retention (a ratio of a gloss after the test to an initial gloss) is measured and a color difference (ΔE) before and after the test is measured with a color difference meter (CR300 available from Minolta Co., Ltd.). Further a change in appearance of a coating film after the test is evaluated with naked eyes.

EXAMPLES 2 to 11 and COMPARATIVE EXAMPLE 1

The thermosetting fluorine-containing resin powder coating compositions comprising components shown in Table 1 were prepared and coated in the same manner as in Example 1, and various tests were carried out. The results are shown in Table 1.

Other pigments shown in Table 1 are those mentioned below.

Black 1: Baked pigment available from Shepherd Chemical Co., Ltd., average particle size: 1.2 µm Blue 9: Baked pigment available from Shepherd Chemical Co., Ltd., average particle size: 1 µm Blue 3: Baked pigment available from Shepherd Chemical Co., Ltd., average particle size: 0.5 µm Green 5: Baked pigment available from Shepherd Chemical Co., Ltd., average particle size: 1.9 µm Yellow 25: Baked pigment available from Shepherd Chemical Co., Ltd., average particle size: 1.7 µm Brown 12: Baked pigment available from Shepherd Chemical Co., Ltd., average particle size: 0.5 µm Phthalocyanine blue: Organic pigment available from Dainichiseika Color & Chemicals Mfg. Co., Ltd., average particle size: 0.53 µm Carbon black: Laben available from Columbia Chemical Co., Ltd., average particle size: 0.011 µm

TABLE 1

| | Example | | | | | | | | | | | Com. Ex |
|---|---|---|---|---|---|---|---|---|---|---|---|---|
| | 1 | 2 | 3 | 4 | 5 | 6 | 7 | 8 | 9 | 10 | 11 | 1 |
| Components of powder coating composition (parts by weight) | | | | | | | | | | | | |
| Fluorine-containing copolymer | 55.5 | 55.5 | 55.5 | 55.5 | 55.5 | 55.5 | 55.5 | 55.5 | 55.5 | 55.5 | 55.5 | 55.5 |
| Rutile titanium oxide | 24 | 24 | 29.5 | 0.5 | 24 | 15 | 27 | 3 | 3 | 15 | 24 | 30 |
| Other pigment | | | | | | | | | | | | |
| KNR | 6 | | | | | | | | | | | |
| Black 1 | | 6 | 0.5 | 29.5 | | | | | 3 | | | |
| Blue 9 | | | | | 6 | | | | | | | |
| Blue 3 | | | | | | 15 | | | | | | |
| Green 5 | | | | | | | 3 | | | | | |
| Yellow 25 | | | | | | | | 27 | | | | |
| Brown 12 | | | | | | | | | 24 | | | |
| Phthalocyanine blue | | | | | | | | | | 15 | | |
| Carbon black | | | | | | | | | | | 6 | |
| Curing agent | 14 | 14 | 14 | 14 | 14 | 14 | 14 | 14 | 14 | 14 | 14 | 14 |
| Leveling agent | 0.5 | 0.5 | 0.5 | 0.5 | 0.5 | 0.5 | 0.5 | 0.5 | 0.5 | 0.5 | 0.5 | 0.5 |
| Characteristics of coating film | | | | | | | | | | | | |
| Gloss | | | | | | | | | | | | |
| Melt-kneading and pulverizing step | | | | | | | | | | | | |
| Once | 49 | 47 | 44 | 44 | 43 | 37 | 39 | 44 | 29 | 66 | 65 | 30 |
| Twice | 55 | 56 | 52 | 51 | 55 | 57 | 60 | 53 | 46 | 67 | 65 | 47 |
| Three times | 56 | 56 | 54 | 52 | 57 | 58 | 60 | 55 | 47 | 67 | 65 | 51 |
| Gloss retention (%) | 83 | 88 | 62 | 85 | 82 | 81 | 83 | 87 | 85 | 61 | 55 | 56 |
| Color difference (ΔE) | 8.5 | 2.8 | 5.5 | 5.8 | 5.5 | 5.4 | 4.9 | 4.4 | 3.2 | 12.6 | 10.5 | 3.5 |

EXAMPLE 12

(Coating Composition Conforming to AAMA 2605 Standard)

31 Grams of fluorine-containing copolymer (A-2) powder prepared in Preparation Example 2, 14.4 g of rutile titanium oxide (TI-PURE R-960), 3.6 g of baked pigment (Blue 3), 15.5 g of curing agent (B-1530) and 0.3 g of leveling agent (MODAFLOW) were dry-blended in a polyethylene bag by shaking. Then the mixture was melt-kneaded at 100° C. for ten minutes with a twin-screw kneader (available from Toyo Seiki Co., Ltd.), and after cooled, pulverized at room temperature for three minutes with a universal pulverizer (available from IKA Co., Ltd.). The obtained powder was classified with a 200 mesh screen to give a powder coating composition. The powder coating composition was coated on the above-mentioned aluminum plate subjected to chemical conversion treatment by using a corona discharge type powder coating gun (GX3300 available from Onoda Cement Kabushiki Kaisha) at an applied voltage of 40 kV, and then immediately baking was carried out at 200° C. for 20 minutes to give a coated plate. The above-mentioned tests specified in AAMA 2605 were carried out by using the coated plate. A weather resistance test was carried out in Florida by exposing the test plate inclined at 45° and facing in southern direction at South Florida Test Service in the State of Florida for a period of time of from July, 1989 to June, 1999. The results are shown in Table 2.

EXAMPLE 13

(Blend With non-fluorine-containing Resin)

20 Grams of fluorine-containing copolymer (A-3) powder prepared in Preparation Example 3, 11 g of hydroxyl-containing olyester resin (FINEDIC M8020 available from Dainippon Ink and hemicals, Inc.), 14.4 g of rutile titanium oxide (TI-PURE R-960), 3.6 g of baked pigment (Blue 3), 15.5 g of curing agent (B-1530) and 0.3 g of eveling agent (MODAFLOW) were dry-blended in a polyethylene bag by shaking. Then the mixture was melt-kneaded at 100° C. for ten minutes with a twin-screw kneader (available from Toyo Seiki Co., Ltd.), and after cooled, pulverized at room temperature for three minutes with a universal pulverizer (available from IKA Co., Ltd.). The obtained powder was classified with a 200 mesh screen to give a powder coating composition. The powder coating composition was coated on the above-mentioned aluminum plate subjected to chemical conversion treatment by using a corona discharge type powder coating gun (GX3300 available from Onoda Cement Kabushiki Kaisha) at an applied voltage of 40 kV, and then immediately baking was carried out at 200° C. for 20 minutes to give a coated plate. The above-mentioned tests specified in AAMA 2604 were carried out by using the coated plate. A weather resistance test was carried out in Florida by exposing the test plate inclined at 45° and facing in southern direction at South Florida Test Service in the State of Florida for a period of time of from July, 1989 to August, 1994. The results are shown in Table 2.

COMPARATIVE EXAMPLE 2

A test plate was produced in the same manner as in Example 12 except that only rutile titanium oxide was added without using other pigment, and the tests specified in AAMA 2605 were carried out. The results are shown in Table 2.

TABLE 2

| AAMA standard | Example 12 | Example 13 | Com. Ex. 2 |
|---|---|---|---|
| Uniformity of color | Uniform in evaluation with naked eyes by personnel concerned | | |
| Gloss | 65 | 72 | 62 |
| Hardness of coating film | H | F | H |
| Adhesion | | | |
| Dry | 100/100 | 100/100 | 100/100 |
| Wet | 100/100 | 100/100 | 100/100 |
| Boiling water | 100/100 | 100/100 | 100/100 |
| Impact resistance | Passed | Passed | Passed |
| Abrasion test | Passed | Passed | Passed |
| Chemical resistance | | | |
| Hydrochloric acid | Passed | Passed | Passed |
| Mortar | Passed | Passed | Passed |
| Nitric acid | Passed | Passed | Passed |
| Detergent | Passed | Passed | Passed |
| Window cleaner | Passed | Passed | Passed |
| Corrosion resistance | | | |
| Moisture resistance | Passed | Passed | Passed |
| Brine resistance | Passed | Passed | Passed |
| Weather resistance (exposed in Florida) | 10-year exposure | 5-year exposure | 10-year exposure |
| Color difference (ΔE) | 4.2 | 4.7 | 2 |
| Chalking | 8 | 8 | 4 |
| Gloss retention (%) | 56 | 51 | 45 |
| Erosion resistance | Passed | Passed | Passed |

EXAMPLE 14

(Example of Aluminum Sash)

The powder coating composition prepared in Example was coated on an aluminum sash (available from YKK Corporation) obtained by subjecting extrusion-molded aluminum to phosphate chromate treatment by using a corona discharge type powder coating gun (GX3300 available from Onoda Cement Kabushiki Kaisha) at an applied voltage of 40 kV in a powder coating booth put to earth, and then immediately baking was carried out at 200° C. for 20 minutes.

After the coating, a state of coating on various parts was evaluated with naked eyes, and a three-dimensional throwing property on a rugged portion of a door rail was good (non-uniformity of a coating thickness is small).

INDUSTRIAL APPLICABILITY

The fluorine-containing resin powder coating composition according to the present invention can form a coating film which can exhibit excellent weather resistance even under very strict environment specified in AAMA 2605 standard, and is suitable particularly for exterior member for building, for example, an aluminum sash.

What is claimed is:

1. A powder coating composition which comprises (A) a fluorine-containing copolymer having a crosslinkable reactive group and (B) a curing agent being capable of forming crosslinkage by reacting with the crosslinkable reactive group of the fluorine-containing copolymer in a weight ratio (A)/(B) of 40/60 to 98/2, and contains rutile titanium oxide and an organic pigment and/or inorganic pigment, wherein a particle size ratio of said titanium oxide to other pigment is from 1/0.01 to 1/20.

2. The powder coating composition of claim 1, wherein said fluorine-containing copolymer (A) comprises a fluoroolefin unit and has a fluorine content of not less than 10% by weight, a MFR of from 0.1 to 100 g/10 min measured at 100° to 180° C. and a glass transition temperature of from 30° to 120° C.

3. The powder coating composition of claim 1, wherein said other pigment is an inorganic pigment.

4. The powder coating composition of claim 3, wherein said inorganic pigment is a baked pigment.

5. The powder coating composition of claim 1, wherein said other pigment is an organic pigment.

6. The powder coating composition of claim 1, wherein a particle size ratio of said titanium oxide to other pigment is from 1/0.1 to 1/20.

7. The powder coating composition of claim 1, which further comprises a non-fluorine-containing resin as a resin for powder coating composition.

8. The powder coating composition of claim 1, wherein a coating film obtained by coating the composition conforms to AAMA2604 standard.

9. The powder coating composition of claim 1, wherein a coating film obtained by coating the composition conforms to AAMA2605 standard.

10. An exterior member for building which is coated with the powder coating composition of claim 1.

11. The exterior member for building of claim 10, which is an aluminum sash.

12. The powder coating composition of claim 1, wherein the powder coating composition contains rutile titanium oxide and an organic pigment selected from the group consisting of powders of condensed azo compounds, isoindolenone compounds, quinacridone compounds, diketopyrrolopyrol compounds, anthraquinone compounds, dioxadine compounds, metal complexing azo compounds, allyl amide compounds, azo compounds, diallylide compounds, pyrazolone compounds, toner compounds, phthalocyanine compounds, basic dye compounds, naphthol compounds and benzimidazolone compounds.

13. The powder coating composition of claim 1, containing rutile titanium oxide and an inorganic pigment selected from the group consisting of powders of metal oxide, composite metal oxide, metal salt, metal, luster, ultramarine and gold pink.

* * * * *